US007146133B2

(12) United States Patent
Bahl et al.

(10) Patent No.: US 7,146,133 B2
(45) Date of Patent: Dec. 5, 2006

(54) WIRELESS TRANSMISSION INTERFERENCE AVOIDANCE ON A DEVICE CAPABLE OF CARRYING OUT WIRELESS NETWORK COMMUNICATIONS

(75) Inventors: Pradeep Bahl, Redmond, WA (US); Amer Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 10/735,945

(22) Filed: Dec. 15, 2003

(65) Prior Publication Data

US 2004/0259589 A1    Dec. 23, 2004

Related U.S. Application Data

(60) Provisional application No. 60/480,434, filed on Jun. 19, 2003.

(51) Int. Cl.
*H04B 1/00* (2006.01)
*H04B 15/00* (2006.01)

(52) U.S. Cl. ............... 455/63.1; 455/553.1; 455/67.13; 455/557; 455/296; 455/69; 455/114.2; 455/502; 370/350; 370/312; 370/324; 701/301; 701/72; 340/7.6; 340/407.1; 340/825.19

(58) Field of Classification Search ............... 455/63.1, 455/67.13, 553.1, 501, 502, 557, 296, 114.2; 701/301, 72; 370/350, 312, 324
See application file for complete search history.

(56) References Cited

U.S. PATENT DOCUMENTS

| | | | |
|---|---|---|---|
| 6,535,747 B1 * | 3/2003 | Shah et al. | 455/522 |
| 6,807,155 B1 * | 10/2004 | Subramanian | 370/252 |
| 6,892,073 B1 * | 5/2005 | Fattouch | 455/446 |
| 6,954,616 B1 * | 10/2005 | Liang et al. | 455/63.1 |
| 6,970,708 B1 * | 11/2005 | Raith | 455/440 |
| 6,978,121 B1 * | 12/2005 | Lane et al. | 455/73 |
| 7,027,418 B1 * | 4/2006 | Gan et al. | 370/329 |
| 7,072,296 B1 * | 7/2006 | Turner et al. | 370/230.1 |
| 7,072,663 B1 * | 7/2006 | Ramos et al. | 455/453 |

OTHER PUBLICATIONS

U.S. Appl. No. 10/693,655, filed Oct. 24, 2003, Krantz et al.
U.S. Appl. No. 10/724,843, filed Dec. 1, 2003, Bhanu et al.
U.S. Appl. No. 09/805,500, filed Nov. 28, 2002, Ayyagari et al.
U.S. Appl. No. 10/723,673, filed Nov. 26, 2003, Wolman.

* cited by examiner

*Primary Examiner*—Marceau Milord
(74) *Attorney, Agent, or Firm*—Wolf, Greenfield & Sacks, P.C.

(57) ABSTRACT

A wireless technology (e.g., Wi-Fi) coexistence architecture and method are disclosed for managing potential conflicts between wireless technology interference sources. A coexistence driver maintains a conflict map identifying potentially conflicting wireless technologies on a computing device. Such technologies, due to their use of overlapping transmission frequency spectra, potentially create signal interference with one another while transmitting. Managing such conflict is carried out by initially identifying conflicts arising from wireless technology interference sources based on entries within the conflict map for a set of currently installed wireless technology interfaces. Thereafter the coexistence driver creates a virtual coexistence driver to manage an identified set of conflicting wireless technology interference sources, wherein the coexistence driver regulates transmission of data sets by wireless technology interfaces according to a coexistence scheme including priority-based data transmissions.

59 Claims, 5 Drawing Sheets

WIRELESS TRANSMISSION INTERFERENCE AVOIDANCE ON A DEVICE CAPABLE OF CARRYING OUT WIRELESS NETWORK COMMUNICATIONS

CROSS-REFERENCE TO RELATED APPLICATION

This invention claims priority based on U.S. Provisional Patent Application Ser. No. 60/480,434, filed Jun. 19, 2003, entitled "Conflict Avoidance Across Competing Network Technologies," which is hereby incorporated by reference in its entirety, including references therein.

FIELD OF THE INVENTION

This invention generally relates to the area of computer systems. More particularly, the present invention concerns methods and systems for selecting, configuring, and/or controlling wireless network communications on computing devices. Even more particularly the present invention is directed to decision-making within computing devices for addressing and/or avoiding wireless signal transmission interference.

BACKGROUND OF THE INVENTION

Today, a variety of wireless networking technologies support network connectivity. Wireless wide area network (WWAN) technologies, such as those embodying the GPRS, WCDMA, 802.16, etc. protocols, enable computing devices to connect to remote computer networks via cellular data transmission networks. Wireless local area network (WLAN) technologies, such as those incorporating the IEEE 802.11 a/b/g, HomeRF, Hiperlan/2, etc. protocols enable users to access local area network resources via wireless access points/transceivers. Wireless personal area network (WPAN) technologies, such as Ultra Wideband (UWB), and Bluetooth (BT), represent yet another wireless technology incorporated within computers today. There are other technologies that fall in the realm of data control such as Zigbee and RFID. Physical and media access layer components associated with these technologies, in many instances, operate within overlapping frequency ranges in an uncoordinated manner—which results in signal interference.

Depending upon configuration and proximity to wireless network transceivers, a computing device receives/transmits radio frequency waves associated with one or more of the above-identified wireless technologies. In fact, depending upon the location, a computing device is able to maintain simultaneous wireless network connections via distinct network interface cards (NICs) installed on the computing device. Simultaneous availability/existence of wireless communication technologies and their associated wireless signal transmissions arise, for example, within an office environment that supports wireless local area network, wireless wide area network, and personal area network connectivity. The presence of multiple simultaneous networking technology options enhances flexibility with regard to how a computing device connects to networks and/or resources (including computer peripherals such as speakers, a keyboard, a mouse, etc.).

However, the abundance and wide variety of RF sources also increases the likelihood that a computing device having wireless communication capabilities will encounter and/or create signal interference, which leads to lowered quality of service and an unpleasant user experience. There are many types of interference—each having differing characteristics. For example, two wireless transceivers that utilize overlapping frequency spectrums create signal interference resulting in lost packets, dropped connections and uneven throughput (in the case of streaming connections). In some instances, a first transceiver operates at a sufficiently high signal power such that its operation is not affected by other competing signals; however, the operation of a second, lower power wireless transceiver is saturated by the higher power interfering signal from the first transceiver.

Interference can arise from differing sources. A first type of interference arises from the computing device itself that is simultaneously operating more than one wireless transmitter/receiver. For example, a computing device supports multiple wireless interfaces, incorporating different wireless technologies, that use overlapping wireless signal frequency bands. As a result, the wireless interfaces create conflict when used simultaneously. An example of such overlapping wireless technologies involves using IEEE 802.11b or 802.11g simultaneously with Bluetooth PAN appliances—since 802.11b/g transceivers utilize wireless frequencies that overlap frequencies potentially utilized by a Bluetooth wireless connection.

In an exemplary scenario where the existence of simultaneously active wireless interfaces/transceivers on a single computing device leads to signal interference, a DVD player streams a movie over an 802.11b WLAN connection to a personal computer. The personal computer user is simultaneously using a wireless (Bluetooth) mouse to check on movies facts in a separate window that is downloading pages from the Internet (accessed through a Bluetooth phone connected over GPRS). The Bluetooth signal between the mouse and the personal computer and between the personal computer and the Bluetooth phone conflicts with audiovisual data streaming signal from the DVD to the personal computer. The signal interference results in jerky presentation of the movie. The mouse movements are also likely to be jerky.

In another exemplary interference scenario, a camcorder sends an audiovisual stream to a personal computer over ultra wideband (UWB). At the same time, a user is connected to a wireless transceiver (access point) for a network over an 802.11a wireless connection that connects the user to the Internet via a cable modem/DSL line. In this potential interference scenario, the 802.11a signal interferes with the UWB data transmissions. As a consequence, the streamed recorded session appears jerky.

A second type of interference source arises from signal transmissions to/from other computing devices or interference sources that exist/operate independently of a computing device experiencing signal interference with regard to one or more wireless transmitters/receivers—external interference sources over which the computing device has no control. In addition to other computers, access points, etc. such interference can also arise from a variety of external interference sources such as cordless telephones, microwave ovens, etc.

A number of signal collision avoidance schemes operate within a single wireless protocol/technology. For example, in the area of wireless WAN, transceivers/drivers utilize CSMA/CA, TDMA, and FDMA protocols that avoid transmission collisions with other transmitters utilizing the same technology. Such collision avoidance schemes are not well suited for heterogeneous wireless transmissions over shared frequency ranges because the different wireless transmissions can be using different collision avoidance protocols. This is especially true in the case of WPAN/WLAN wireless transceivers such as Bluetooth/UWB and 802.11 competing simultaneously for transmission time within unlicensed/unregulated overlapping frequency ranges.

One way for computing devices to respond to encountering signal interference is to allow the affected connection to degrade/fail. The computing device becomes aware of a particular connection failing. If the connection fails, the user is prompted to try re-connecting, or the user potentially selects an alternative network communication media (e.g., a wired connection to a network).

Known MAC drivers have implemented conflict avoidance schemes handling two wireless technologies. Vendors have implemented collaborative and/or signal cancellation schemes to avoid interference. For instance, in a single system including both an 802.11b and a Bluetooth transceiver, the system coordinates transmissions at the MAC level through a mode switch. The mode switch operation is based upon lower-layer procedures such as beacon reception (for 802.11b), paging (for Bluetooth), or by interleaving packets. The vendor's NIC can potentially support both Bluetooth (BT) and 802.11 in which case the NIC can determine when either of the two competing/interfering technologies is being used and stops the other transmission until the first is done. If there are two NICs, one for Bluetooth and one for 802.11, the two NICs could potentially be hardwired to each other so that one can determine when the other is transmitting and stop its own transmissions. This is a two-wire or four-wire approach depending upon the number of wires between the two NICs. Alternatively, a notification about a transmission can potentially be provided by one driver to another, for instance the Bluetooth driver or the 802.11 driver potentially provides a callable interface that would be used by the other driver to provide notification of a transmission. The mode switch arbitrates between 802.11b Bluetooth traffic. Then the switch allows transmission in favor of the traffic with higher priority. It is common to let traffic from HID devices (keyboard and mouse) to have the highest priority. Otherwise, 802.11b will have the priority traffic.

Furthermore, known wireless network interface selection criteria base automated selection of a Wi-Fi technology upon SSID (identity of a wireless network—facilitating determination of connectivity to particular resources such as the Internet) and maximum supported network connection speed. Under this relatively simple arrangement, if two differing wireless technologies offer connectivity to a same network/resource, then the faster wireless technology is selected.

SUMMARY OF THE INVENTION

The present invention comprises a method and framework for managing signal interference encountered by one or more wireless network interfaces. A network communications handler, referred herein as a coexistence driver, interposed between applications and physical network interface drivers, implements a co-existence scheme that potentially improves wireless network interface performance in the presence of one or more sources of signal interference.

The present invention comprises, in part, a method for managing wireless transmission conflicts on a computing device that supports at least two wireless transmitters that are capable of simultaneously transmitting data information that potentially leads to signal conflicts. More particularly, the method comprises a step of identifying a potential signal conflict arising from simultaneous transmissions by a first wireless transmitter and a second wireless transmitter currently installed on the computing device.

At the request of one or more applications executing on the computing device, the computing device prepares to transmit a first set of data via the first wireless transmitter, and prepares to transmit a second set of data via the second wireless transmitter. The computing device also assigns priorities to the first and second sets of data. Thereafter, the computing device transmits the first set of data and second set of data, via the first wireless transmitter and the second wireless transmitter, respectively, on a non-conflicting basis and in accordance with priorities assigned to the first and second data sets. As will be explained further herein below, transmitting the first and second data sets on a non-conflicting basis occurs in a variety of ways in accordance with particular embodiments of the invention.

In accordance with another inventive aspect, a method is disclosed for avoiding conflicts between wireless technology interference sources. The method comprises maintaining a conflict map identifying potentially conflicting wireless technologies. Such technologies, due to their use of overlapping transmission frequency spectra, potentially create signal interference with one another. Managing such conflict is carried out by initially identifying conflicts arising from wireless technology interference sources based on entries within the conflict map for a set of currently installed wireless technology interfaces. Thereafter a virtual coexistence driver is created to manage an identified set of conflicting wireless technology interference sources, wherein the coexistence driver regulates transmission of data sets by wireless technology interfaces according to a coexistence scheme.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

An illustrative wireless network interface configuration/control architecture disclosed herein facilitates highly flexible/adaptable wireless network interface control spanning multiple wireless technologies. The wireless network interface configuration/control platform, in the illustrative embodiment, includes a coexistence driver that executes at a network communications layer over individual media access drivers that generally control the flow of data sets (e.g., packets) for a particular media type (e.g., 802.11 WLAN). The coexistence driver, instantiates one or more virtual coexistence drivers (VCDs), each of which handles a particular combination of potentially interfering wireless media technologies and even multiple network interfaces incorporating a same wireless media technology. A VCD accumulates status information and performance metrics from network interface devices (e.g., network interface cards) associated with each wireless technology in the combination being handled by it.

Initially, the coexistence driver determines the set of virtual coexistence drivers currently needed for a computing device that utilizes one or more wireless networking technologies. The coexistence driver determines the set of interference sources/technologies currently affecting the operation of presently installed wireless network interfaces. The coexistence driver consults a conflict map specifying the potentially conflicting wireless technologies for each supported wireless technology. If a conflicting wireless technology within the conflict map is currently installed on the computing device, then it is added to a conflict set. Furthermore, if a machine only has an 802.11b card, but a Bluetooth phone is in the vicinity of the machine and is currently talking to another machine or an AP, then the Bluetooth interference source is factored into the selection and configuration of a particular VCD for the purpose of carrying out conflict avoidance. The machine containing the 802.11b card is limited in its conflict avoidance strategy since it only has control over 802.11b device and not over the BT device. However, at least part of an 802.11b/BT VCD's conflict avoidance logic (e.g., changing the 802.11 frequency band) can potentially be used. Upon completion of this initial conflict detection step, the coexistence driver selects and launches a VCD corresponding to each identified set of conflicting technologies/interference sources.

Each virtual coexistence driver established by the coexistence driver utilizes status information and performance metrics accumulated from the individual media access control (MAC) drivers of the conflicting wireless technologies to perform a set of tasks associated with controlling the flow of data sets (e.g., packets) to media access control drivers for communication over the wireless network interfaces installed on a computing device. Such tasks include: prioritizing transmitting data sets associated with conflicting (and therefore alternatively activated) wireless network interfaces; maintaining prioritized queues associated with pending requests, and passing queued data sets down to the media access control drivers according to a prioritization scheme; performing decision-making, based upon information supplied by multiple media access drivers, for adapting the operation of the wireless network interfaces; and issuing command/control instructions to the media access control drivers to control the wireless network interface cards in a manner that facilitates non-interfering operation of wireless interfaces and any other sources of wireless communication signal interference—whether arising from other installed wireless network interface cards or external sources of interference. In the illustrative embodiment, control packets are passed through the coexistence driver (without processing) to avoid delaying time-critical information from reaching the wireless network interfaces.

Thus, in summary, the coexistence driver is a higher-level network device driver that executes a coexistence protocol on top of a set of media-specific access control drivers to handle conflicts/interference between same or distinct wireless technologies. The coexistence driver handles conflicts/interference in potentially many ways, including disabling/avoiding using particular frequency ranges (channels) in a particular wireless transceiver to eliminate signal frequency overlap or signal bleed where even if the frequencies are non-overlapping, because of their close proximity, the transmission over one can affect the transmission/reception over the other. In the event that signal frequency overlap cannot be prevented, then the coexistence driver controls (multiplexes) data set transmissions by the competing wireless technologies to avoid simultaneous use of the overlapping frequencies by multiple wireless technologies represented within a virtual coexistence driver. The position of the coexistence driver above media-specific wireless media access control drivers enables the coexistence driver to implement a variety of conflict/interference reduction schemes, based upon accumulated wireless network metrics, including handling the different data sets (e.g., packets) to be transmitted over different interfaces appropriately, that would otherwise not be available or difficult to obtain by the individual media access control drivers because of their lack of a global view across different media access control drivers or even an absence of coordination between two network interfaces because they are from different vendors or using the same wireless technology such as two 802.11b transceivers on the same computing device.

Figure 1:
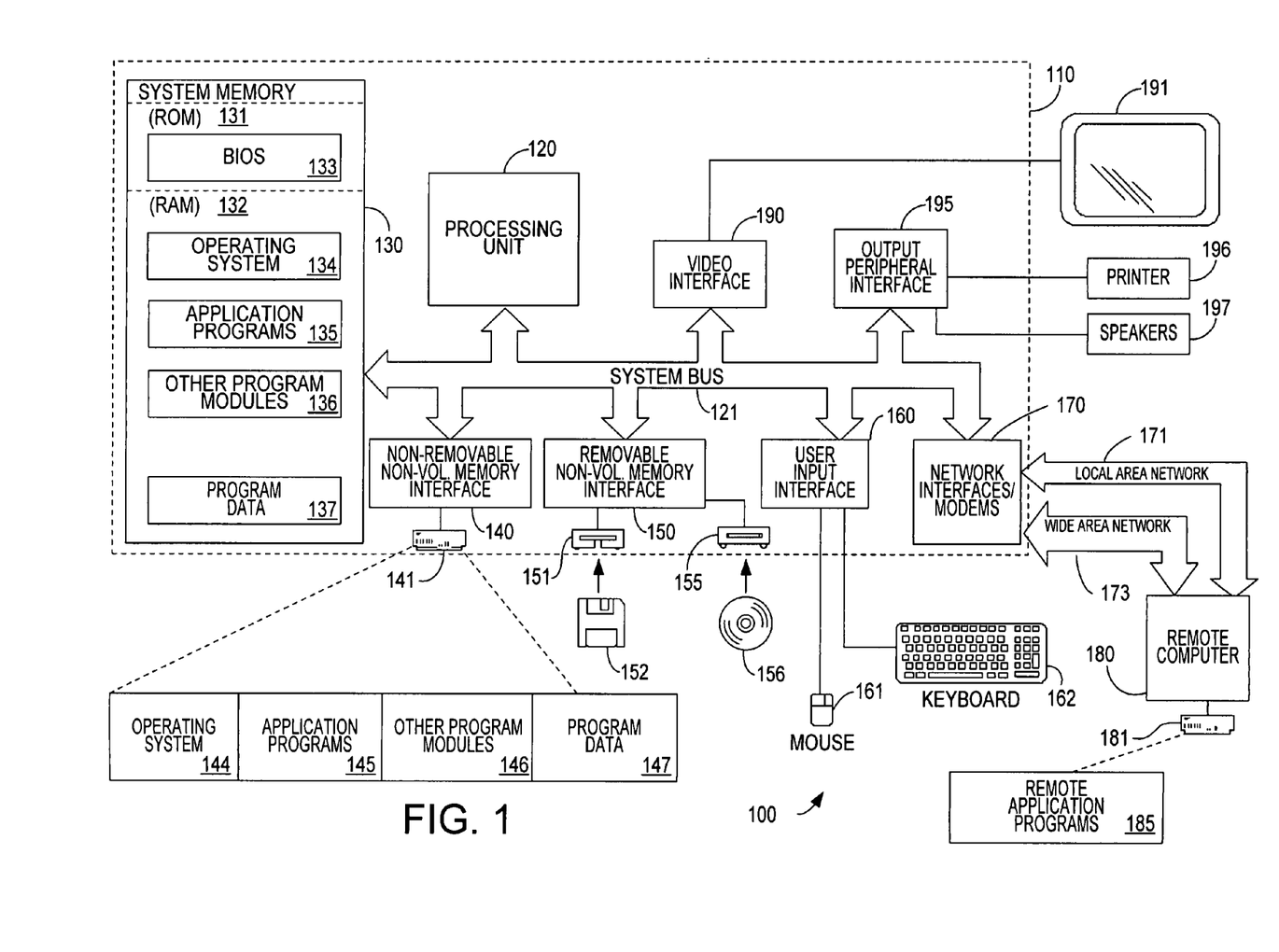
FIG. 1 is a simplified schematic illustrating an exemplary architecture of a computing device for carrying out an embodiment of the present invention.

FIG. 1 illustratively depicts an example of a suitable operating environment 100 for a computing device (e.g., a notebook computer, an appliance such as access point, etc.) used in an environment supported by multiple networks accessed via various differing wireless communication technologies. The operating environment 100 is only one example of a suitable operating environment, and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, server appliances, access points, base stations, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media such as wireless PAN, wireless LAN and wireless WAN media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through one or more wired/wireless network interfaces 170. Furthermore, the set of one or more wired/wireless network interfaces 170 support communications over the WAN 173, such as the Internet. While not shown in FIG. 1, computer 110 potentially includes an internal or external modem, connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention is potentially incorporated into both mobile and non-mobile computing devices/machines used in a variety of dynamic networking environments and executing a variety of tasks. In such environments, the availability of certain channels/frequencies potentially changes as the set of active wireless media changes. This in turn can have an adverse effect upon the quality of service on particular wireless media. The present invention facilitates configuring and/or regulating traffic to wireless network interfaces to reduce interference between wireless network interfaces that use overlapping frequency ranges. An embodiment of the present invention also accommodates interference arising from external sources (e.g., a cordless phone system, a microwave oven, a Bluetooth device transmitting to another computing device, etc.) over which a computing device has no control.

Figure 2:
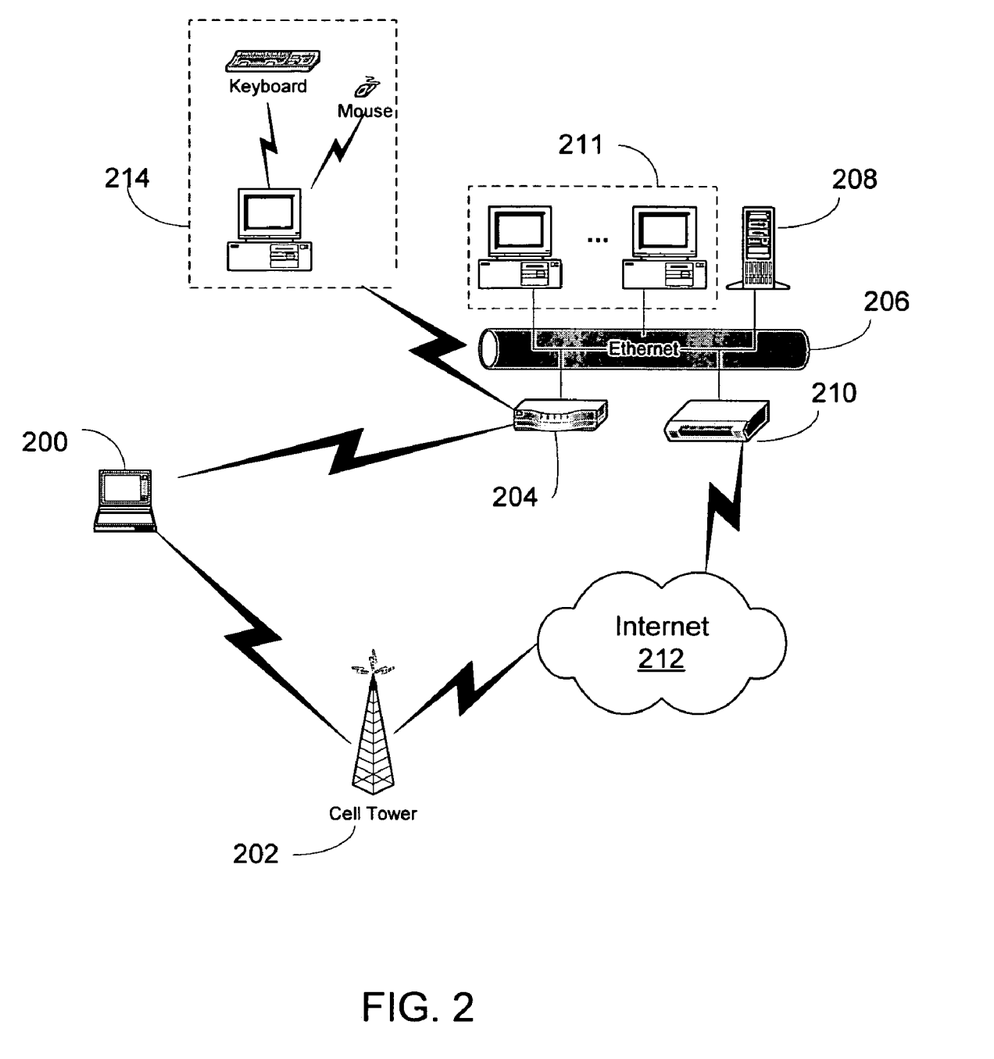
FIG. 2 is an exemplary multiple network communication media arrangement including multiple competing/interfering wireless technologies.

Turning to FIG. 2, a simple example of a wireless computing environment is depicted wherein the invention is potentially exploited. In the illustrative environment, a notebook computer 200 includes multiple network interface cards (not specifically shown) facilitating communications over multiple network media. In the particular example depicted in FIG. 2, the notebook computer 200 potentially communicates with a cellular transmission tower 202 using WWAN wireless technology such as GPRS and a wireless transceiver 204 using WLAN wireless technology such as 802.11b.

The wireless transceiver 204 (also referred to as a wireless access point, or WAP), provides access to a variety of resources on the LAN 206. For example, the wireless transceiver 204 provides access by the notebook computer 200 to directories maintained on a file server 208. The LAN 206 also contains a gateway/firewall/modem 210 providing access, by users of computing devices connected to the LAN 206 (including a set of computers 211 and the user of the notebook computer 200), to the Internet 212. The gateway/firewall/modem 210 also provides access by users of the Internet 212 to resources on the LAN 206.

The user of the notebook computer 200, as a result of the multiple supported network media, is able to access the Internet 212 and the file server 208 (through the Internet 212) via multiple communication media. For example, utilizing a WWAN network interface, the notebook computer 200 is able to access the Internet 212 via a cellular network including the cellular transmission tower 202. Alternatively, the notebook computer 200 accesses resources on the LAN 206 via the wireless transceiver 204. The LAN 206 in the illustrative example is assumed to include network access and proxy servers that enable a properly authenticated user of the notebook computer 200 to access resources of the Internet 212 and the LAN 206 via either of the two illustratively depicted wireless network media. Such dual capabilities introduces the potential for selection of a particular one of the wireless network media based upon current conditions, needs, preferences, etc. of the user of the notebook computer 200.

In the illustrative network embodiment depicted in FIG. 2, a personal computer 214 located proximate to the notebook computer 200 is equipped with multiple wireless network technology interfaces. The personal computer 214 communicates with the LAN 206 via the wireless transceiver 204 (operating under the 802.11b WLAN protocol). Furthermore, and of particular relevance to an embodiment of the present invention, the PC 214 includes a Bluetooth wireless transceiver/interface supporting a variety of wireless appliances including, for example, a mouse, a keyboard and a phone. Because the specified frequency spectra of the Bluetooth and 802.11b wireless network communication protocols overlap, the simultaneous operation of Bluetooth appliances and an 802.11b connection potentially affects/degrades the quality of service on the 802.11b connection between the personal computer 214 and the wireless transceiver 204. Likewise, the 802.11b connection potentially affects/degrades the quality of service on the Bluetooth connections. Furthermore, if the notebook computer 200 is sufficiently close to other Bluetooth appliances that may/may not be communicating with the notebook computer, then the 802.11b WLAN connection between the notebook computer 200 and the wireless transceiver 204 is also potentially adversely affected by interference associated with the Bluetooth signal transmissions and vice versa. This scenario as well as others such as the ones described herein above are handled by a coexistence driver that processes information associated with potentially multiple wireless technologies to establish/carry out a coexistence scheme that seeks to address signal interference arising from overlapping frequency spectra associated with same or distinct wireless network technologies—such as Bluetooth and 802.11b wireless communications. A special case is one of interference between transceivers utilizing a same wireless network technology such as two 802.11b, g, or a radios using overlapping frequencies or frequencies that are close to each other—and therefore create signal interference.

Figure 3:
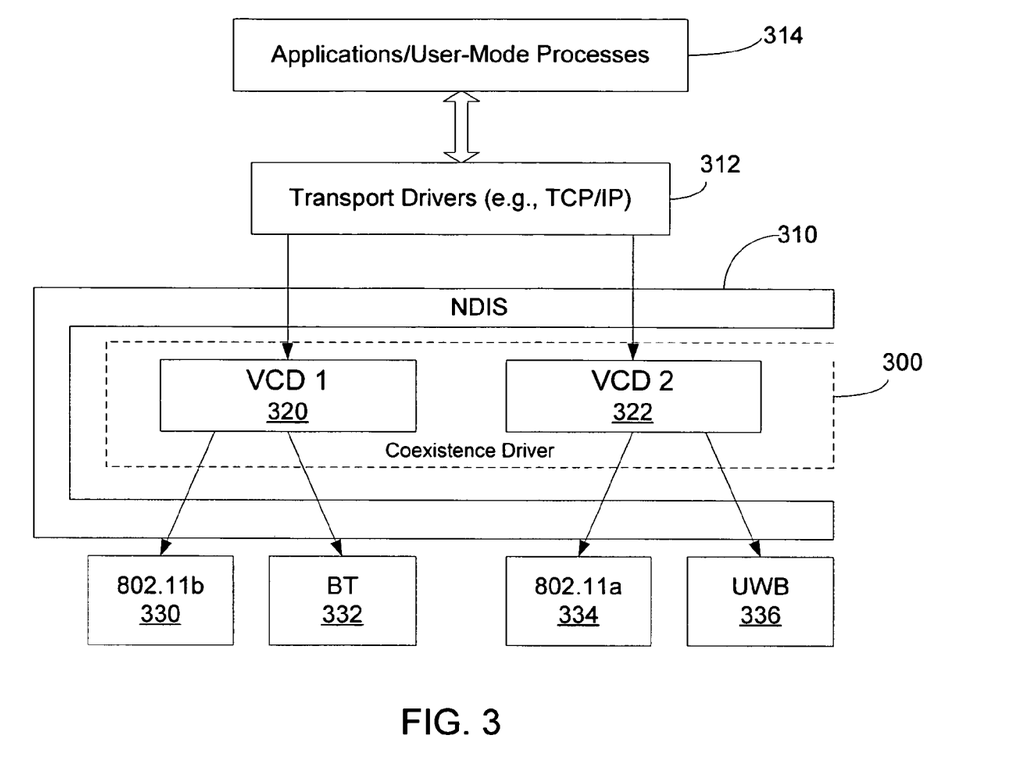
FIG. 3 is a schematic diagram identifying components in system including a coexistence driver embodying the present invention.

Turning to FIG. 3, a coexistence driver 300 incorporated within computing devices including wireless network interfaces such as the notebook computer 200 and personal computer 214, applies adaptation and packet flow control schemes to operational/status information pertaining to potentially multiple supported network media technologies across potentially multiple network interfaces. Thereafter, the coexistence driver 300 configures wireless network interfaces and, if necessary, sequences/controls data packet flow to wireless network interfaces experiencing interference from either internal or external sources. In the illustrative embodiment of the invention, the coexistence driver 300 operates within a network driver interface specification (NDIS) layer 310 of the MICRSOFT WINDOWS operating system. Thus, rather than requiring a separate set of interfaces, the exemplary coexistence driver 300 operates as an intermediate sub-layer within the NDIS layer 310 through which outgoing data from transport drivers 312 passes before being submitted to protocol-specific wireless interface drivers.

With continued reference to FIG. 3, in an embodiment of the invention the coexistence driver 300 creates/installs and hosts a set of virtual coexistence drivers (VCDs) such as VCD 320 and VCD 322 for handling particular combinations of actual or external interfering wireless technologies. Each of the VCDs handles packets destined for one of a set of wireless network interfaces supported by the VCD. For example, the VCD 320 handles packets destined for an 802.11b network interface driver 330 and a Bluetooth network interface driver 332. The VCD 322 handles packets destined for an 802.11a network interface driver 334 and an Ultra Wideband network interface driver 336. By placing the VCDs above the individual network interface drivers, the VCDs are able to perform a variety of configuration/control operations based upon aggregated information associated with each of a set of interfaces utilizing potentially interfering network technologies (e.g., Bluetooth and 802.11b).

In an embodiment of the invention, all VCDs are derived from a base class managed by the coexistence driver 300. The coexistence driver 300 creates a particular instance of a VCD, including a customized context and functions, based upon identified sources of interference. Identification of conflicting technologies and sources of interference and selection of appropriate VCDs instances are discussed further herein below. Once installed, the degree of control and the nature of control of each VCD over packets passed down to network interface drivers via the NDIS layer 310 is determined by programming of the VCDs and, potentially, configuration selections exposed to users by the coexistence driver 300 and/or the VCDs hosted by the coexistence driver 300.

Figure 4:
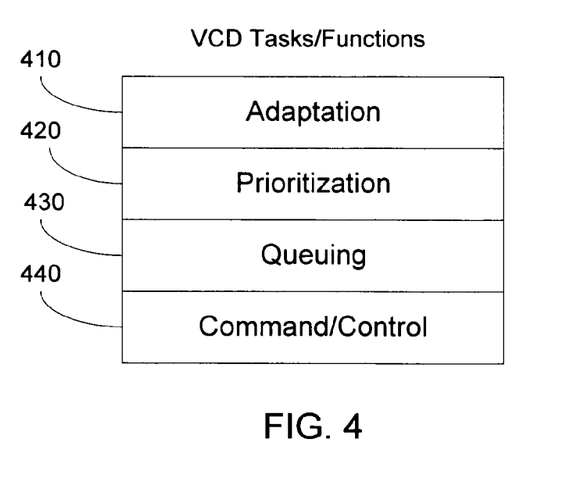
FIG. 4 summarizes an exemplary set of tasks embodied within virtual coexistence drivers that carry out coexistence schemes for handling sources of wireless interface signal interference.

Having generally described an exemplary wireless network driver arrangement for carrying out the present invention, attention is directed to FIG. 4 that identifies a set of tasks/functions executed by exemplary VCDs and customized according to a set of interference sources for which the VCDs manage coexistence. It is noted that the identified tasks are not necessarily limited to particular program segments/modules. Rather, the tasks are identified as a way to conceptualize and compartmentalize exemplary functionality exhibited by VCDs created by the coexistence driver 300 to adaptively handle interference problems that arise from conflicting wireless technologies as well as any other sources of interference Adaptation Task 410

An adaptation task 410, carried out by the VCDs within the virtual coexistence driver 300 involves designating, in response to a set of identified actual/potential interference conditions, a coexistence scheme for a set of installed wireless interfaces. A set of exemplary coexistence schemes are described herein below with reference to FIGS. 6 and 7. The adaptation task 410 further comprises rendering wireless network interface control instructions carrying out the designated scheme. The interface control instructions establish a particular mode of operation of the network interfaces and/or regulate the timing of data packet transmissions by the particular network interfaces under the control of associated drivers. For example, the VCD 320 designates a coexistence scheme and makes configuration and data traffic control decisions regarding a first network interface associated with the 802.11b driver 330 and a second network interface associated with the Bluetooth driver 332.

C/I Computations Application/Channel Selection

In an embodiment of the invention, the adaptation task, as embodied in the adaptation task 410 periodically processes information about each of the particular wireless technologies for the VCD to render a congestion/interference (C/I) metric for each supported channel for each particular supported wireless technology. The information gathered for each channel of a given wireless technology includes, for example: signal strength, packet error rate, packet loss, average retry count, noise level, and estimated congestion. Such information, or at least parts thereof, is provided by known media access control drivers. The C/I metric takes into account both interference generated by installed wireless transceivers and external sources of interference—such as another user operating a Bluetooth device for another computing device.

The C/I metric generated for each channel of each wireless technology is thereafter used in potentially many ways by the VCD to reduce/avoid interference between wireless technologies and other sources of signal interference. In a first form of interference avoidance, the adaptation task 410 utilizes the C/I metric generated for a particular wireless technology to select a best channel or set of channels upon which data traffic flows for the particular wireless technology. However, in instances where no acceptable channels are available and an alternative wireless technology is available for supporting the desired traffic flow, the VCD executes a wireless technology selection procedure. In this second form of interference avoidance the network selection procedure (discussed herein below) is executed by, for example, the coexistence driver 300 to determine a different network communication technology to handle the traffic flow.

Prioritization Task 420

The prioritization task 420 implemented by each VCD ensures that crucial information is passed in a timely manner and ensures that all data packets, regardless of initially assigned priority, are eventually transmitted according to the prioritization scheme specified by the adaptation task 410. Such prioritization schemes are desired in cases where sequenced, non-simultaneous packet transmissions are prescribed to handle potential conflicts between two or more co-located wireless technologies. In an exemplary traffic handling method described below, the prioritization task 420 is responsible for assigning/re-assigning priority to data packets passed down to the NDIS layer 310.

The priorities are potentially assigned to data traffic handled by the VCDs according to a variety of factors that generally reflect the individual needs of a user/application from which the data originates. The priorities are initially assigned, for example, by user-specified preferences regarding application priority. In other instances, priorities are based upon particular applications for which particular priorities are provided to ensure a particular data rate. Similarly, in yet other instances, initial priority is based upon an application type (e.g., a DVD viewer program), the type of data (e.g., phone conversation), or the destination of the data (a DVD player).

In an embodiment of the invention, all control packets are automatically passed to network interface drivers without regard to any coexistence scheme currently implemented by a VCD of the coexistence driver 300. MAC level control packets are not handled by the coexistence driver for a number of reasons. First, the coexistence driver 300 is unaware of the protocols implemented by the MAC driver. Second, MAC control information is time-critical (microsecond granularity). Furthermore, the control packets are considered high priority, and thus it is appropriate to transmit such packets first (as high priority/time critical packets) without regard to priority and let the MAC drivers handle conflicts (and packet losses) that may arise from by-passing the VCD traffic control schemes. Because control transmissions make up a relatively small percentage of all transmissions, such pass-through accommodation for the control packets does not substantially effect the advantages provided by the VCDs with regard to conflict avoidance. On the other hand, the time criticality of data packets varies considerably, and the volume of some data transmissions, if not prioritized, delays transmission of time-critical (e.g., control) packets.

Queuing Task 430

The queuing task 430 operates in coordination with the prioritization task 420 and command/control task 440 to sequentially transmit data packets down to technology-specific drivers in an orderly manner to avoid signal transmission interference for conflicting wireless technologies. The queuing task 430 maintains a queue of pending data packets for each supported priority level (or sub-levels that facilitate prioritizing within each queue level by originally assigned priority). In an embodiment of the invention, each VCD that supports a sequencing coexistence scheme (described herein below with reference to FIG. 7) implements a software switch that takes a packet at the head of the queue, passes the packet to an appropriate wireless technology interface driver, receives a transmit complete notification, and then sends a next pending packet (referred to herein generally as a data set in recognition of potentially other ways of grouping data for transmission via a network interface).

In an embodiment of the present invention, the queuing task 430, upon completion of the sequential transmission of all or some packets (based on criteria of avoiding starvation of low priority packets in the presence of a steady stream of high priority packets) for a currently highest priority queue, boosts the priority of all remaining pending packets (associated with lower priority queues) by one level before resuming transmitting packets from a highest transmit queue having pending packets. Furthermore, within each priority level, sub-levels are maintained according to base priority levels assigned to packets when they were initially queued. Within the highest current queue level, sub-level queues are handled in the order of the base priority assigned each packet.

Command/Control Task 440

The command/control task 440 involves communicating control instructions to relevant network interface drivers. Such instructions are based, in a first instance, upon configuration decisions rendered by the adaptation task 410 such as channel selections and other high-level operation mode decisions. Thereafter, in a second instance, the command/control task 440 receives packet transmission requests designating one of the network interface drivers. In response, the command/control task 440 issues wireless technology protocol-specific commands/instructions to the designated drivers to initiate transmitting the received packets. The command/control task 440 subsequently receives and passes packet transmission completion notifications that are potentially used by the VCD to ensure only one packet is transmitted at a time in cases where conflicting interface drivers do not support coexistence schemes. As noted above, in an embodiment of the invention, the conflict avoidance mechanisms are not applied to time-sensitive control packets since the control packets are passed to the appropriate network communication driver without imposing potential waits within the queues maintained by VCDs.

Method for Creating VCDs

Figure 5:
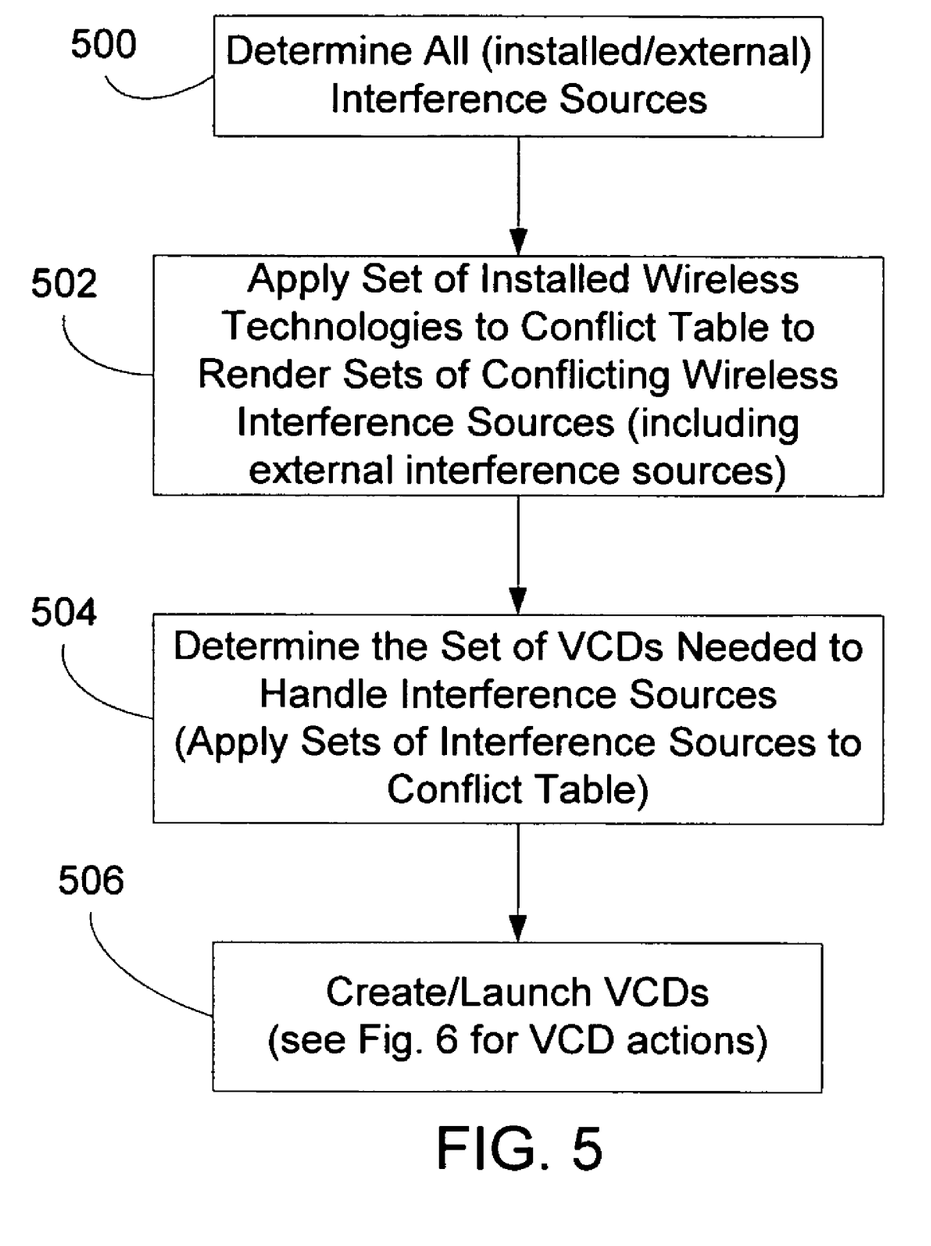
FIG. 5 summarizes a set of steps performed by a coexistence driver to designate and activate a set of virtual coexistence drivers.

Having described an exemplary coexistence architecture for implementation within a computing system, attention is directed to FIG. 5 that summarizes steps performed by the coexistence driver 300 to create VCDs to handle potential signal conflicts between wireless technologies and any other sources of wireless signal interference encountered by network interfaces on a computing device during transmission of sets of data (e.g., packets). In an embodiment of the present invention, the coexistence driver 300 launches VCDs on demand and according to a set interference sources presently known by a computing device upon which the coexistence driver 300 resides. The computing device awaits notifications regarding changes to a set of interference sources (including multiple network interfaces utilizing a same wireless technology), and launches new VCDs, if needed, to handle changes to the set of co-located and external interference sources.

With reference to FIG. 5, in response to any one of a variety of notification types, including activation of a wireless network interface and sensing a new interference source, at step 500 the coexistence driver 300 assembles a set of potential sources of wireless interference for which coexistence handling is desired. In an embodiment of the invention the set of potential sources of interferences includes both co-located sources (e.g., installed wireless network interfaces) and external sources (e.g., a Bluetooth transceiver on a neighbor's computer system). The co-located sources are determined, for example, by querying a bindery that lists a set of installed devices (including wireless network interfaces). The external sources are identified by sensing and analyzing (by the coexistence driver 300) signal characteristics and/or manually inputting a source type by a user having knowledge of a current operating environment.

Thereafter, during step 502, the coexistence driver 300 renders sets of conflicting wireless interference sources. In an embodiment of the invention, a master conflict map (e.g., a table or any other suitable data structure) is maintained that enumerates a set of "known" wireless technologies. For each wireless technology, a set of known sources of interference are identified within the master conflict table. An exemplary master conflict table is provided below that identifies conflicts with regard to 802.11a/b, Bluetooth, and UWB wireless technologies. The first row identifies a set of potential sources of interference with wireless interfaces. The first column identifies a set of wireless interface technologies. A more space-efficient arrangement entails a mapped set of bits within a stored set of bytes where each bit position represents a particular interference source type.

|  | 802.11b | 802.11a | UWB | BT |
| --- | --- | --- | --- | --- |
| 802.11b |  |  |  | X |
| 802.11a |  |  | X |  |
| UWB |  | X |  |  |
| BT | X |  |  |  |

The coexistence driver 300 initially determines the set of interference sources for each wireless technology currently installed on the computing device. In an embodiment of the invention, for each installed wireless interface, the coexistence driver 300 traverses a set of interference sources that are known to potentially interfere with each installed wireless interface. If an interference source identified during step 500 is present within the set of interference sources, then the interference source is added to a set of interference sources for purposes of designating an appropriate VCD. When all the installed wireless interfaces have been processed, intersecting sets of interference sources are determined and the contents (identified interference sources) are merged. In the illustrative example set forth in FIG. 3, 802.11b and Bluetooth technologies belong to one interference source set, while 802.11a and UWB wireless technologies belong to a second set for which a VCD will be created.

During step 504, one or more VCDs are designated (if needed) by the coexistence driver 300 to handle interfering signal sources. In particular, the resulting merged sets of interference sources identified during step 502 are applied to a set of VCD descriptions to determine appropriate VCDs that are to be instantiated by the coexistence driver 300. In the example provided in FIG. 3, the coexistence driver 300 creates the VCD 320 to handle potential conflicts between an 802.11b network interface and a Bluetooth interface, and the coexistence driver 300 creates the VCD 322 to handle potential conflicts between an 802.11a network interface and a UWB interface.

It is noted that a particular wireless technology need not be present/installed on the computing device upon which the coexistence driver 300 operates to be considered an interference source for purposes of designating/creating VCDs. Thus, for example, VCD 320 is created to handle conflicts between 802.11b and Bluetooth technologies regardless of whether both types of wireless network interfaces are located on the computing device (or one of the wireless technologies is merely an external source of interference). However, the subsequent operation of the adaptation 410, the prioritization 420 and the queuing 430 tasks of the VCD is effected by whether the interference source is located on the computing device since an external interference source cannot submit data sets (packets) for transmission by the computing device. A VCD is capable of adapting to external interference sources. By way of example, if a VCD determines that an 802.11b transmitter is creating interference, then the VCD can adapt/restrict transmissions by a BT driver under its supervisory control to particular, non-impacted frequency ranges. Likewise, if the source of interference of an 802.11b transceiver is a BT transmitter, then the VCD can potentially select a particular available channel that is less likely to encounter interference with the BT transmitter.

During step 506 the coexistence driver 300 launches the set of VCDs designated during step 504. In an illustrative embodiment, the VCDs 320 and 322 are instantiated from sub-classes derived from a VCD base class. As such, VCDs 320 and 322 share an executable code base that is provided for all VCDs launched by the coexistence driver 300. However, each subclass includes its own unique set of functions, operations, methods, etc. for carrying out the above-described VCD tasks set forth in FIG. 4. Each VCD instance is provided its own context. Each of the VCDs operates within the coexistence driver 300 that, in turn, operates at as intermediate layer within the NDIS protocol stack.

Coexistence Handling by Each VCD

Figure 6:
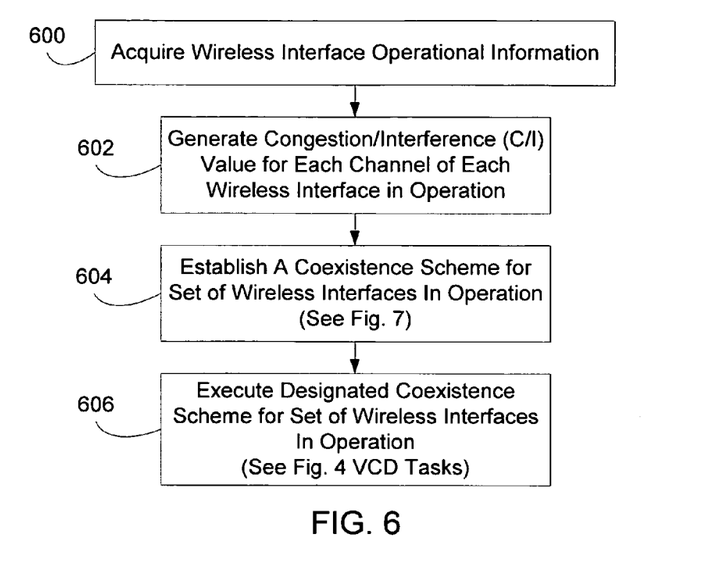
FIG. 6 summarizes a set of steps performed by virtual coexistence drivers performed upon launch.

Turning to FIG. 6, a set of steps summarize the operation of an exemplary VCD upon being launched by the coexistence driver 300 during step 506. In general, the VCD performs a set of steps to adapt the VCDs operation to existing/potential interference conditions. Thereafter, the VCD carries out a designated coexistence scheme addressing currently existing interference conditions. In an embodiment of the invention, the set of steps summarized in FIG. 6 is restarted and executed upon receiving notification of an appropriate triggering event—such as a lost connection, a disabled network interface, degradation of quality of service on a wireless interface, etc.

Once launched by the coexistence driver 300, at step 600 the VCD, or an entity acting on behalf of the VCD, obtains operational information from media access control drivers regarding the installed network interfaces with which the VCD is associated. Such information includes: operational frequencies, signal strength, packet error rate, average retry count, packet loss rate, noise threshold, etc. The information gathering step 600 can be repeated any number of times for every iteration of the steps set forth in FIG. 6-*even* while other ones of the steps depicted in FIG. 6 are executing. Thus, the data acquired between iterations of the complete sequence depicted in FIG. 6 can be processed (e.g., averaged) to eliminate instantaneous aberrant readings that do not represent the long-term operating environment of the wireless network interfaces.

During step 602, the VCD determines a "congestion/interference (C/I) metric" for each channel of each wireless interface in accordance with the above-described adaptation task 410. The metric, in an embodiment of the present invention, comprises a weighted average of the information acquired during step 600. Thereafter, during step 604, also associated with the adaptation task 410, the C/I values are used to select an available channel (or channels) for one or more of the traffic flows to one or more wireless network interfaces served by the VCD. An exemplary set of steps for performing channel selections, and potentially selecting a different network interface, is described herein below with reference to FIG. 7.

After selecting a set of channels, at step 606 the VCD executes the aforementioned VCD adaptation 410, prioritization 420, queuing 430, and command/control 440 tasks specified, by way of example, in FIG. 4. The adaptation task 410 potentially includes periodically determining the C/I values for the channels and re-executing steps 600, 602 and 604 to establish a new set of channels (and possibly a differing set of network interfaces).

Figure 7:
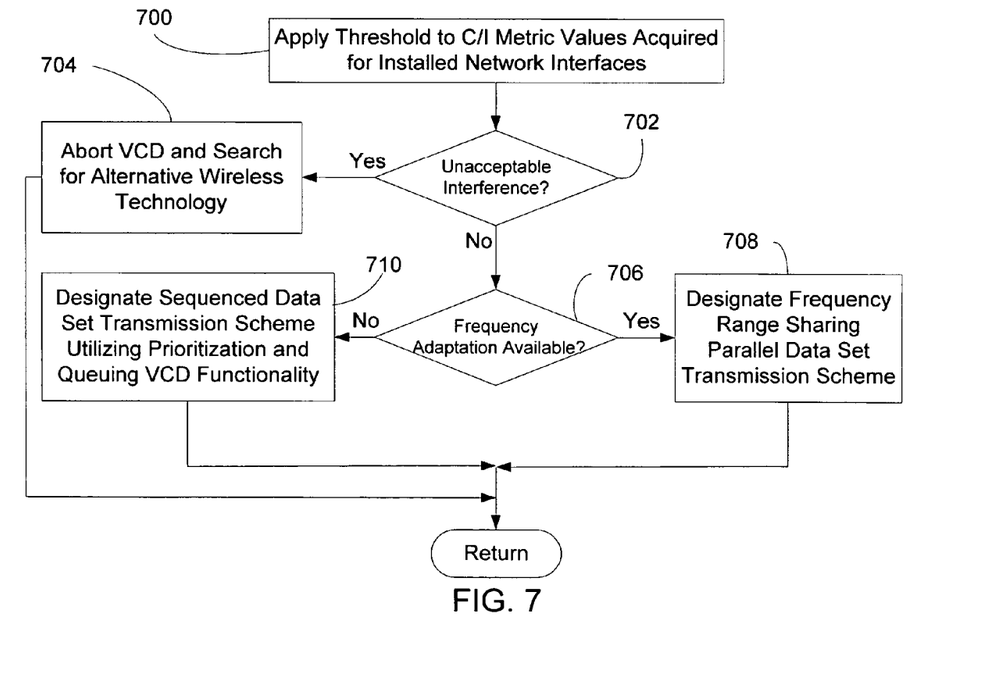
FIG. 7 summarizes a set of steps performed by virtual coexistence drivers to establish a coexistence scheme addressing potential wireless interference sources.

Turning to FIG. 7, a set of steps are summarized for performing channel selections and establishing an appropriate coexistence scheme for a set of wireless network interfaces served by a VCD. Initially, during step 700 the VCD applies a threshold value, and a channel selection scheme, to the C/I metric values generated during step 602 to render one or more channels for each wireless network interface upon which data packets will be transmitted. By way of example, if a C/I metric for a channel is below an acceptable threshold, the VCD searches for a better channel for the same wireless technology and switches to that channel. In the case of wireless technologies that utilize multiple channels (e.g., Bluetooth or two network interfaces using the same wireless technology), the VCD determines a set of acceptable channels. Thereafter at step 702, if one or more of the wireless interfaces/technologies is experiencing unacceptable interference such that the channel selection step 700 failed to establish a satisfactory set of channels for the set of wireless interfaces administered by the VCD, then control passes to step 704.

At step 704, if an acceptable alternative wireless technology or network provider for a same technology (e.g., two different Wi-Fi network access point providers using different frequencies) can be found, then steps are performed to initiate switching to the alternative technology/network. In general, selection of an alternative wireless technology or network is performed in a way ensuring that the alternative technology/network meets base level functionality provided by the wireless interface/technology deemed unacceptable during step 702. For example, it is generally not desirable to switch to a network that does not provide as much connectivity or is less secure. Since the set of wireless technology interfaces has potentially changed, a new set of VCDs are determined for the computing device.

If at step 702, the wireless network interfaces exhibit acceptable signal quality, then control passes to step 706. At step 706 the VCD initially makes a general selection between two coexistence scheme types: frequency adaptation and interface switching. In an embodiment of the invention, if frequency adaptation is available, then control passes to step 708. At step 708, the VCD designates a frequency range sharing coexistence scheme wherein the frequency range/channel used by any one of the set of wireless interfaces/technologies represented by the VCD is non-overlapping with any frequency range/channel used by any other wireless interface/technology in the set. When selecting the frequency range(s), a larger separation is preferred to a smaller separation in order to protect against signal bleed. Thus, by carefully selecting operating frequency ranges, transmissions by the set of wireless technologies can occur in parallel. Examples of such schemes are provided below.

Band Selection Between Co-located Technologies Adaptation

In one coexistence scheme designated during step 708, the adaptation task 410 attempts to eliminate interference by adjusting the set of channels/frequency ranges used by one or more of the competing technologies. For example, in the case of the VCD 320, which handles conflicts between 802.11b and Bluetooth transmissions, the adaptation task 410 designates a set of channels for an adaptive hop set utilized by the Bluetooth transmitter that is non-overlapping with a frequency range of a channel currently utilized by the 802.11b transceiver. Similarly, VCD 322 designates particular channels to be used by the UWB transceiver to avoid a channel currently being used by the 802.11a transceiver. Once the channels/frequency ranges have been determined by the adaptation task 410, the decisions are carried out through network interface driver-specific instructions issued by a Command/Control task 440.

If however, at step 706 frequency adaptation is not available, then control passes to step 710 wherein a transceiver switching coexistence scheme is designated by the VCD. In this case, the VCD regulates the flow of packets down to the wireless network interface drivers to ensure that data packets are not simultaneously transmitted within a same frequency range by the computing device.

Transceiver Switching Between Co-located Technologies Adaptation

If data traffic cannot be transmitted simultaneously by conflicting wireless technologies due to unresolved transmission channel overlap, then the VCD prescribes a time slicing mode of operation for a set of wireless network interfaces wherein each of the conflicting co-located wireless interfaces transmits data in mutually exclusive time frames.

The VCD configures a traffic sequencing scheme, in accordance with an aspect of the adaptation task 410, that is carried out by prioritization 420, queuing 430, and command/control 440 tasks described herein below. While operating within the traffic sequencing mode, data traffic for conflicting wireless technologies is regulated by the VCD to ensure that two conflicting channels are not simultaneously used by the computing device to transmit data packets. A traffic handling algorithm (described herein below) based upon, for example, C/I metrics, transmission priority, starvation time, driver delays, etc. establishes an order for transmitting pending data packets over the conflicting wireless technologies supported by the particular VCD instance.

Need-Based Transceiver Switching Between Co-located Technologies Adaptation

In a variation of the above-described transceiver switching scheme for handling conflicting wireless network interface technologies, the adaptation task 410 utilizes knowledge of when a particular wireless technology will be using a particular frequency band to implement a coexistence scheme that transmits in parallel at some points in time and sequentially during others (due to transmit frequency conflicts). In a particular example, involving co-located Bluetooth and 802.11b wireless network interfaces, the Bluetooth 1.0 interface hops over 79 channels, and each channel is 1 MHz wide. It therefore covers almost the entire ISM band 2.402 to 2.483 GHz. The 802.11b network interface uses 22 MHz of this band. Therefore a potential for conflict with 802.11b signal transmissions exists on 22 channels of the Bluetooth 1.0 interface.

The following coexistence scheme, specified by the adaptation task 410, takes advantage of concurrency when the Bluetooth interface is utilizing the remaining 57 non-overlapping frequencies. To facilitate implementing the above concurrency scheme, the virtual coexistence driver 320 determines/employs the hopping algorithm currently being used by the Bluetooth driver (a function of the clock and the MAC address of the master). When determining whether or not to hold off sending a packet because of a concurrent 802.11b transmission, the VCD determines whether a next hop interferes with the 802.11b transmission. If it is not, then concurrent Bluetooth and 802.11b transmissions are permitted.

In closing, with regard to FIG. 7, the above-described coexistence schemes are merely exemplary. The coexistence driver 300 architecture provides a highly flexible and open-ended architecture that supports designating virtually any type of coexistence scheme through VCD specifications associated with particular combinations of identified conflicting wireless technologies. For example, rather than organizing/queuing data packets by priority, in an embodiment of the invention, packets are arranged by application, source, wireless interface, by combinations of these and/or priority (e.g., high priority BT preferred over high priority 802.11, but low priority 802.11 over low priority BT), etc. Furthermore, the steps depicted in FIG. 7 are exemplary. In alternative embodiments of the invention wherein one of the two general types of coexistence schemes are supported by the VCD, then step 706 need not be performed.

It will be appreciated by those skilled in the art that a new and useful method and framework for facilitating configuration/selection of one or more modes of wireless network access have been described herein. More particularly, the wireless network interface selection and coexistence driver architecture described herein facilitates automated selection of a particular mode of network access based upon status information provided by a set of network interface drivers associated with particular network interfaces and wireless technologies. In view of the many possible computing environments to which the principles of this invention may be applied and the flexibility of carrying out automated network access configuration to address interference and any other coexistence issues that arise when wireless data communication is contemplated, it should be recognized that the embodiment described herein is meant to be illustrative and should not be taken as limiting the scope of invention. Those skilled in the art to which the present invention applies will appreciate that the illustrative embodiment can be modified in arrangement and detail without departing from the spirit of the invention. Therefore, the invention as described herein contemplates all such embodiments as may come within the scope of the following claims and equivalents thereof.

What is claimed is:

1. A method for managing wireless transmission conflicts on a computing device that supports at least two wireless transmitters, and wherein the wireless transmitters are capable of transmitting both control and data information, the method comprising:

identifying a potential signal conflict arising from simultaneous transmissions by a first wireless transmitter and a second wireless transmitter currently installed on the computing device;

preparing to transmit a first set of data via the first wireless transmitter;

preparing to transmit a second set of data via the second wireless transmitter;

assigning priorities to the first and second sets of data; and transmitting the first set of data and second set of data, via the first wireless transmitter and the second wireless transmitter, respectively, on a non-conflicting basis and in accordance with priorities assigned to the first and second data sets.

2. The method of claim 1 wherein the first wireless transmitter embodies a first wireless technology and the second wireless transmitter embodies a second wireless technology.

3. The method of claim 2, wherein the identifying step comprises:
performing a lookup operation in a table based on the first wireless technology and the second wireless technology.

4. The method of claim 3, further comprising executing the identifying step to update a previous lookup operation, in response to one or more performance measures for a network interface, from a set of performance measures including:
packet loss rates,
packet errors,
noise level, and
packet retransmit rates.

5. The method of claim 1, wherein priorities are generated, during the assigning step, based on user-specified preferences for application priority.

6. The method of claim 1, wherein priorities are generated, during the assigning step, based on which applications are generating the data.

7. The method of claim 1, wherein priorities are generated, during the assigning step, based on which application types are generating the data.

8. The method of claim 1, wherein priorities are generated, during the assigning step, based on the destination of the data.

9. The method of claim 1, wherein priorities are generated, during the assigning step, based on the type of the data.

10. The method of claim 1, wherein a priority assigned to the first set of data is raised in response to a delay encountered in transmitting the first set of data due to transmission of higher priority sets of data.

11. The method of claim 1 further comprising:
maintaining a set of prioritized queues for managing transmission of data sets of differing priorities.

12. The method of claim 1 further comprising:
adapting operation of the first and second network interfaces to avoid signal conflicts during simultaneous transmissions.

13. The method of claim 1 wherein the transmitting step is managed by a coexistence driver that controls passing of data sets from transport drivers to media access drivers for transmission via the first and second wireless transmitters.

14. A computer-readable medium including computer-executable instructions for facilitating managing wireless transmission conflicts on a computing device that supports at least two wireless transmitters, and wherein the wireless transmitters are capable of transmitting both control and data information, the computer-executable instructions facilitating performing the steps of:
identifying a potential signal conflict arising from simultaneous transmissions by a first wireless transmitter and a second wireless transmitter currently installed on the computing device;
preparing to transmit a first set of data via the first wireless transmitter;
preparing to transmit a second set of data via the second wireless transmitter;
assigning priorities to the first and second sets of data; and
transmitting the first set of data and second set of data, via the first wireless transmitter and the second wireless transmitter, respectively, on a non-conflicting basis and in accordance with priorities assigned to the first and second data sets.

15. The computer-readable medium of claim 14 wherein the first wireless transmitter embodies a first wireless technology and the second wireless transmitter embodies a second wireless technology.

16. The computer-readable medium of claim 15, wherein the identifying step comprises:
performing a lookup operation in a table based on the first wireless technology and the second wireless technology.

17. The computer-readable medium of claim 16, further comprising computer-executable instructions for triggering executing the identifying step, to update a previous lookup operation, in response to one or more performance measures for a network interface, wherein the one or more performance measures are taken from a set of performance measures including:
packet loss rates,
packet errors,
noise level, and
packet retransmit rates.

18. The computer-readable medium of claim 14, wherein priorities are generated, during the assigning step, based on user-specified preferences for application priority.

19. The computer-readable medium of claim 14, wherein priorities are generated, during the assigning step, based on which applications are generating the data.

20. The computer-readable medium of claim 14, wherein priorities are generated, during the assigning step, based on which application types are generating the data.

21. The computer-readable medium of claim 14, wherein priorities are generated, during the assigning step, based on the destination of the data.

22. The computer-readable medium of claim 14, wherein priorities are generated, during the assigning step, based on the type of the data.

23. The computer-readable medium of claim 14, wherein a priority assigned to the first set of data is raised in response to a delay encountered in transmitting the first set of data due to transmission of higher priority sets of data.

24. The computer-readable medium of claim 14 further comprising computer-executable instructions for:
maintaining a set of prioritized queues for managing transmission of data sets of differing priorities.

25. The computer-readable medium of claim 14 further comprising computer-executable instructions for:
adapting operation of the first and second network interfaces to avoid signal conflicts during simultaneous transmissions.

26. The computer-readable medium of claim 14 wherein the transmitting step is managed by a coexistence driver that controls passing of data sets from transport drivers to media access drivers for transmission via the first and second wireless transmitters.

27. A method for avoiding conflicts between wireless technology interference sources, the method comprising:
maintaining a conflict map identifying potentially conflicting wireless technologies;
identifying conflicts arising from wireless technology interference sources based on entries within the conflict map for a set of currently installed wireless technology interfaces; and creating a virtual coexistence driver to manage an identified set of conflicting wireless technology interference sources, wherein the coexistence driver regulates transmission of data sets by wireless technology interfaces according to a coexistence scheme.

28. The method of claim 27 further comprising the steps of:
calculating a congestion/interference (C/I) metric for each of a set of channels; and
applying a threshold to identify satisfactory wireless channels for implementation of the coexistence scheme.

29. The method of claim 28 further comprising the steps of:
determining, during the applying step, that a first wireless technology interface is unacceptable, and
replacing use of the first wireless technology by a second wireless technology.

30. The method of claim 28, wherein the C/I metric is calculated based on one or more of the following: operational frequencies, signal strength, the packet error rate, average packet retry count, and noise level for each conflicting channel.

31. The method of claim 27 wherein the coexistence scheme permits multiple network interfaces to transmit in parallel on non-conflicting channels.

32. The method of claim 27 wherein the coexistence scheme prescribes multiplexing traffic to conflicting network interfaces.

33. The method of claim 32 wherein the coexistence scheme regulates the multiplexed transmission of packets based on one or more of the following parameters:
C/I, traffic priorities, starvation time, and driver delays.

34. The method of claim 32 wherein a VCD created by the coexistence driver includes a queuing functionality for managing pending data packets of varying priority.

35. The method of claim 34 wherein the VCD created by the coexistence driver includes a prioritization functionality for managing the priorities assigned to pending data packets in accordance with a traffic control algorithm.

36. The method of claim 27 wherein a VCD created by the coexistence driver includes adaptation functionality for prescribing mode/frequency of operation of at least one of the wireless technology interfaces to facilitate simultaneous transmissions by multiple wireless technology interfaces.

37. The method of claim 36 wherein the VCD prescribes a mode/frequency of operation of a first network interface and a second network interface embodying a same wireless technology to facilitate simultaneous transmissions by the first and second network interfaces.

38. A computer-readable medium including computer-executable instructions for facilitating avoiding conflicts between wireless technology interference sources, the computer-executable instructions facilitating performing the steps of:
maintaining a conflict map identifying potentially conflicting wireless technologies;
identifying conflicts arising from wireless technology interference sources based on entries within the conflict map for a set of currently installed wireless technology interfaces; and
creating a virtual coexistence driver to manage an identified set of conflicting wireless technology interference sources, wherein the coexistence driver regulates transmission of data sets by wireless technology interfaces according to a coexistence scheme.

39. The computer-readable medium of claim 38 further comprising computer-executable instructions for performing the steps of:
calculating a congestion/interference (C/I) metric for each of a set of channels; and
applying a threshold to identify satisfactory wireless channels for implementation of the coexistence scheme.

40. The computer-readable medium of claim 39 further comprising computer-executable instructions for performing the steps of:
determining, during the applying step, that a first wireless technology interface is unacceptable, and
replacing use of the first wireless technology by a second wireless technology.

41. The computer-readable medium of claim 39, wherein the C/I metric is calculated based on one or more of the following: operational frequencies, signal strength, the packet error rate, average packet retry count, and noise level for each conflicting channel.

42. The computer-readable medium of claim 38 wherein the coexistence scheme permits multiple network interfaces to transmit in parallel on non-conflicting channels.

43. The computer-readable medium of claim 38 wherein the coexistence scheme prescribes multiplexing traffic to conflicting network interfaces.

44. The computer-readable medium of claim 43 wherein the coexistence scheme regulates the multiplexed transmission of packets based on one or more of the following parameters: C/I, traffic priorities, starvation time, and driver delays.

45. The computer-readable medium of claim 43 wherein a VCD created by the coexistence driver includes a queuing functionality for managing pending data packets of varying priority.

46. The computer-readable medium of claim 45 wherein the VCD created by the coexistence driver includes a prioritization functionality for managing the priorities assigned to pending data packets in accordance with a traffic control algorithm.

47. The computer-readable medium of claim 38 wherein a VCD created by the coexistence driver includes adaptation functionality for prescribing a mode of operation of at least one of the wireless technology interfaces to facilitate simultaneous transmissions by multiple wireless technology interfaces.

48. The computer-readable medium of claim 47 wherein the VCD prescribes a mode of operation of a first network interface and a second network interface embodying a same wireless technology to facilitate simultaneous transmissions by the first and second network interfaces.

49. A system including a coexistence architecture facilitating detecting and managing conflicts between wireless technology interference sources, the system comprising:
a conflict map identifying potentially conflicting wireless technologies; and
a coexistence driver for:
identifying conflicts arising from wireless technology interference sources based on entries within the conflict map for a set of currently installed wireless technology interfaces; and
creating a virtual coexistence driver to manage an identified set of conflicting wireless technology interference sources, wherein the coexistence driver regulates transmission of data sets by wireless technology interfaces according to a coexistence scheme.

50. The system of claim 49 wherein the system includes executable instructions for:
   calculating a congestion/interference (C/I) metric for each of a set of channels; and
   applying a threshold to identify satisfactory wireless channels for implementation of the coexistence scheme.

51. The system of claim 50 further comprising executable instructions for:
   determining, during the applying step, that a first wireless technology interface is unacceptable, and
   replacing use of the first wireless technology by a second wireless technology.

52. The system of claim 50, wherein the C/I metric is calculated based on one or more of the following: operational frequencies, signal strength, the packet error rate, average packet retry count, and noise level for each conflicting channel.

53. The system of claim 49 wherein the coexistence scheme permits multiple network interfaces to transmit in parallel on non-conflicting channels.

54. The system of claim 49 wherein the coexistence scheme prescribes multiplexing traffic to conflicting network interfaces.

55. The system of claim 54 wherein the coexistence scheme regulates the multiplexed transmission of packets based on one or more of the following parameters: C/I, traffic priorities, starvation time, and driver delays.

56. The system of claim 54 wherein a VCD created by the coexistence driver includes a queuing functionality for managing pending data packets of varying priority.

57. The system of claim 56 wherein the VCD created by the coexistence driver includes a prioritization functionality for managing the priorities assigned to pending data packets in accordance with a traffic control algorithm.

58. The system of claim 49 wherein a VCD created by the coexistence driver includes adaptation functionality for prescribing a mode of operation of at least one of the wireless technology interfaces to facilitate simultaneous transmissions by multiple wireless technology interfaces.

59. The system of claim 58 wherein the VCD prescribes a mode of operation of a first network interface and a second network interface embodying a same wireless technology to facilitate simultaneous transmissions by the first and second network interfaces.

* * * * *